(12) United States Patent
Abe

(10) Patent No.: US 8,783,310 B2
(45) Date of Patent: Jul. 22, 2014

(54) NON-PNEUMATIC TIRE

(75) Inventor: Akihiko Abe, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 315 days.

(21) Appl. No.: 12/676,779

(22) PCT Filed: Sep. 5, 2008

(86) PCT No.: PCT/JP2008/066071
§ 371 (c)(1),
(2), (4) Date: Mar. 5, 2010

(87) PCT Pub. No.: WO2009/031650
PCT Pub. Date: Mar. 12, 2009

(65) Prior Publication Data
US 2010/0218869 A1   Sep. 2, 2010

(30) Foreign Application Priority Data

Sep. 5, 2007  (JP) .................................. 2007-230238
Mar. 4, 2008  (JP) .................................. 2008-053917

(51) Int. Cl.
*B60B 9/04*   (2006.01)

(52) U.S. Cl.
USPC .................... 152/84; 152/86; 152/12; 152/69

(58) Field of Classification Search
USPC ................ 152/5, 11–12, 17, 69, 80, 84–86
See application file for complete search history.

(56) References Cited

U.S. PATENT DOCUMENTS

| | | | | |
|---|---|---|---|---|
| 1,021,440 A | * | 3/1912 | Arnold et al. | 152/84 |
| 1,146,654 A | * | 7/1915 | Rietschel | 152/11 |
| 1,309,839 A | * | 7/1919 | Bowman | 152/84 |
| 4,832,098 A | | 5/1989 | Palinkas et al. | |
| 4,921,029 A | | 5/1990 | Palinkas et al. | |

(Continued)

FOREIGN PATENT DOCUMENTS

| | | |
|---|---|---|
| DE | 247843 | 6/1912 |
| EP | 0159888 A2 | 10/1985 |

(Continued)

OTHER PUBLICATIONS

International Search Report of PCT/JP2008/066071 dated Dec. 9, 2008.

(Continued)

*Primary Examiner* — Jason Bellinger
(74) *Attorney, Agent, or Firm* — Sughrue Mion, PLLC

(57) ABSTRACT

A plurality of connection members 13 connecting an installation disk 11 to a ring-shaped body 12 are formed, in a side view of the non-pneumatic tire, to be axisymmetrical about an imaginary line connecting the respective first ends 21a and 22a of first connection plates 21 and second connection plates 22 to an axial line O and extending in a tire-radial direction. The connection members 13 are arranged in a tire-circumferential direction such that the first connection plates 21 are arranged at a first tire-widthwise position in the tire-circumferential direction and that the second connection plates 22 are arranged at a second tire-widthwise position in the tire-circumferential direction. According to the invention, it is possible to suppress an increase in the weight, hardness, and rolling resistance to secure satisfactory ride qualities and handling qualities, and it is possible to prevent a blowout from occurring.

12 Claims, 10 Drawing Sheets

(56) References Cited

U.S. PATENT DOCUMENTS

| | | | |
|---|---|---|---|
| 6,170,544 B1* | 1/2001 | Hottebart | 152/11 |
| 6,286,572 B1* | 9/2001 | Chen | 152/84 |
| 2002/0096237 A1* | 7/2002 | Burhoe et al. | 152/11 |

FOREIGN PATENT DOCUMENTS

| | | |
|---|---|---|
| EP | 0297628 A2 | 1/1989 |
| FR | 342 158 | 9/1904 |
| GB | 1176 | 0/1910 |
| GB | 156482 | 7/1921 |
| JP | 09-000122 B | 1/1934 |
| JP | 50-113106 A | 9/1975 |
| JP | 60236803 A | 11/1985 |
| JP | 01285403 A | 11/1989 |
| JP | 04221201 A | 8/1992 |
| JP | 05213001 A | 8/1993 |
| JP | 06-293203 A | 10/1994 |
| JP | 09-058209 A | 3/1997 |
| JP | 2003-039901 A | 2/2003 |
| JP | 2008-030348 A | 2/2008 |
| WO | 2006/116807 A1 | 11/2006 |

OTHER PUBLICATIONS

European Search Report issued in European Application No. 08829703.1, dated Aug. 18, 2011.

Notice of Allowance dated Aug. 27, 2013 issued in corresponding JP 2009-051304.

Japanese Office Action issued in Japanese Application No. 2007-230238 dated Nov. 6, 2012.

* cited by examiner

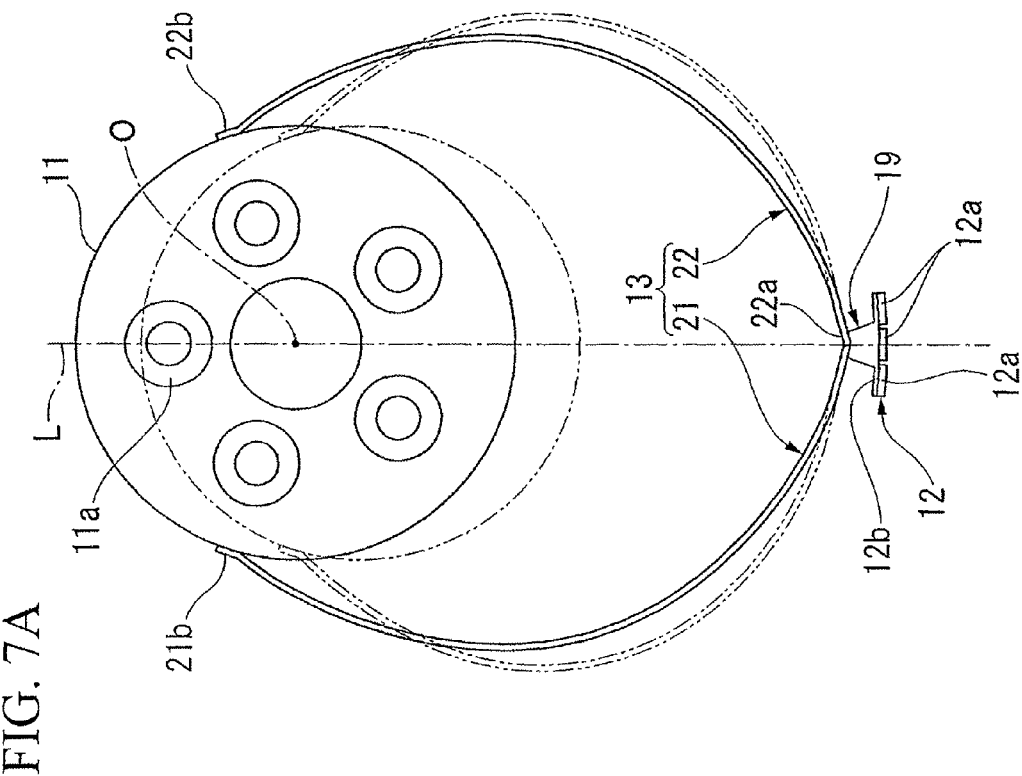
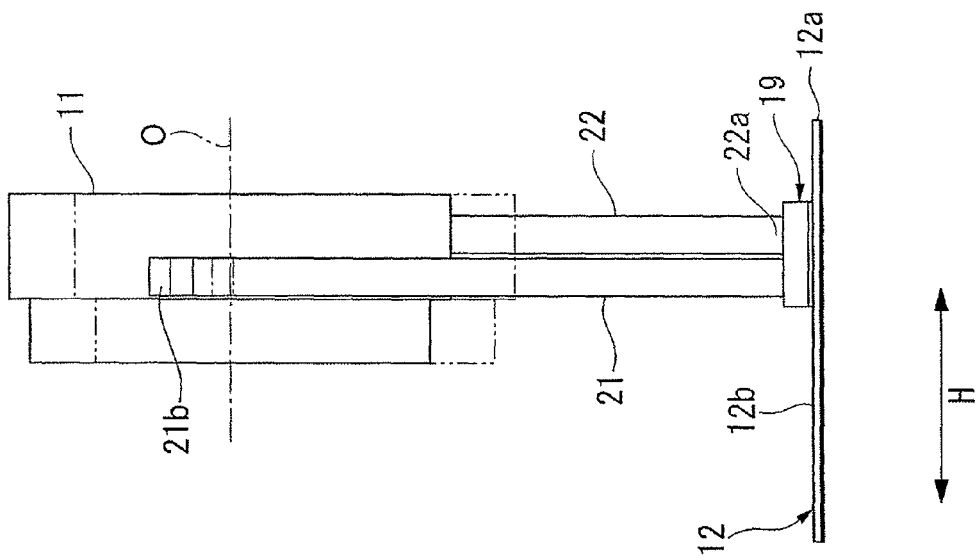

NON-PNEUMATIC TIRE

TECHNICAL FIELD

The present invention relates to a non-pneumatic tire which need not be filled therein with pressurized air when used.

Priority is claimed on Japanese Patent Application No. 2007-230238, filed Sep. 5, 2007, and Japanese Patent Application No. 2008-053917, filed Mar. 4, 2008, the content of which is incorporated herein by reference.

BACKGROUND ART

In the known pneumatic tire filled with pressurized air when used, the possibility of a blowout is an inevitable structural problem.

As a non-pneumatic tire capable of preventing a blowout from occurring, there is a so-called solid tire having a solid structure, which is filled therein with rubber, as described in Patent Document 1.

[Patent Document 1] Japanese Patent Application, First Publication No. H06-293203

DISCLOSURE OF THE INVENTION

Problem to be Solved by the Invention

The known non-pneumatic tire is heavy in weight and has great hardness and rolling resistance as compared with the pneumatic tire. Accordingly, the ride qualities and handling qualities drastically deteriorate, and thus the known non-pneumatic tire cannot be applied to general vehicles and there is a limit to the application range thereof.

The invention has been made in consideration of such circumstances and an object of the invention is to provide a non-pneumatic tire capable of suppressing an increase in weight, hardness, and rolling resistance to secure satisfactory ride qualities and handling qualities, and to prevent blowout from occurring. Another object of the invention is to provide a non-pneumatic tire capable of securing good handling qualities and durability of, making distribution of contact pressure uniform, and of preventing a blowout from occurring.

Means for Solving the Problem

To solve the problems and to achieve such objects, according to the invention, there is provided a non-pneumatic tire including an installation disk that is mounted on an axle, a ring-shaped body that surrounds the installation disk from the outside in a tire-radial direction, a plurality of connection members that connects an outer circumferential face of the installation disk and an inner circumferential face of the ring-shaped body, and a tread rubber that is disposed over an entire outer circumferential face of the ring-shaped body. The plurality of connection members have, in a side view of the non-pneumatic tire in a direction of the axial line, first connection plates curved to protrude toward first side in the tire-circumferential direction and second connection plates curved to protrude toward second side. Respective first ends of the first connection plate and the second connection plate of the connection member are separately connected at the same position in the tire-circumferential direction and at positions different from each other in the tire-widthwise direction, on an inner circumferential face of the ring-shaped body. The connection members are formed, in the side view, to be axisymmetrical about an imaginary line connecting respective first ends of the first connection plate and the second connection plate to the axial line and extending in the tire-radial direction. The plurality of connection members are arranged in the tire-circumferential direction, such that the plurality of first connection plates are arranged at a first tire-widthwise position in the tire-circumferential direction and the plurality of second connection plates are arranged at a second tire-widthwise position in the tire-circumferential direction.

In the invention, the non-pneumatic tire is configured by connecting the installation disk to the ring-shaped body through the connection members, and does not have a solid structure in which the inside is filled with rubber. Accordingly, it is possible to suppress an increase in weight, hardness, and rolling resistance to secure satisfactory ride qualities and handling qualities, and it is possible to prevent a blowout from occurring.

Each connection member is provided with the first connection plate curved to protrude toward first side in the tire-circumferential direction, and the second connection plate curved to protrude toward second side, in the side view. Accordingly, when the installation disk and the ring-shaped body are relatively changed in position in the tire-radial direction, the tire-circumferential direction, or the tire-widthwise direction by external force applied to the non-pneumatic tire, it is possible to easily elastically deform the first connection plates and the second connection plates corresponding to the displacement. Therefore, the non-pneumatic tire can be provided with flexibility, and it is possible to reliably secure satisfactory ride qualities.

Respective first ends of the first connection plate and the second connection plate of each connection member are separately connected at the same position in the tire-circumferential direction and at positions different from each other in the tire-widthwise direction, on the inner circumferential face of the ring-shaped body. A plurality of the connection members is arranged in the tire-circumferential direction such that the first connection plates are arranged at a first tire-widthwise position in the tire-circumferential direction and the second connection plates are arranged at a second tire-widthwise position in the tire-circumferential direction. Accordingly, it is possible to suppress interference between the connection members adjacent to each other in the tire-circumferential direction, and it is possible to prevent the number of arranged connection members from being limited.

Since each connection member is axisymmetrical about the imaginary line in the side view, it is possible to prevent a difference from occurring between a spring constant according to first side in the tire-circumferential direction and a spring constant according to second side in a non-pneumatic tire. Accordingly, with the non-pneumatic tire being in contact with the ground, it is possible to suppress a difference between a spring constant according to a traveling direction and a spring constant according to a braking direction at the contact part of the tire to the ground, and it is possible to reliably secure satisfactory handling qualities.

The ring-shaped body may be divided into a plurality of plate-shaped bodies in the tire-circumferential direction.

In this case, since the ring-shaped body is divided in the tire-circumferential direction, it is possible to easily form the non-pneumatic tire. For example, when a part of the ring-shaped body is damaged, only the damaged part may be replaced without replacing the whole ring-shaped body, and it is possible to easily maintain the tire.

As described above, since the ring-shaped body is divided in the tire-circumferential direction, it is possible to improve flexibility of the ring-shaped body. In addition, it is possible to easily deform the ring-shaped body corresponding to external force applied to the non-pneumatic tire, and it is possible to further reliably secure the satisfactory ride qualities.

The first connection plates and the second connection plates may be formed of a metal or resin.

In this case, it is possible to substantially prevent hysteresis loss from occurring, and it is possible to reduce rolling resistance as compared with a pneumatic tire.

To solve the problems and to achieve such objects, according to the invention, there is provided a non-pneumatic tire including an installation disk that is mounted on an axle, a ring-shaped body that surrounds the installation disk from the outside in a tire-radial direction, a plurality of connection members that are arranged in a tire-circumferential direction and connect the installation disk to the ring-shaped body, and a tread rubber that is disposed over an entire outer circumferential face of the ring-shaped body. Each connection member has, in a side view of the tire in the axial direction, a first connection plate curved to protrude toward first side in the tire-circumferential direction and a second connection plate curved to protrude toward second side, and is formed to be axisymmetrical about an imaginary line extending in the tire-radial direction. The ring-shaped body is divided into a plurality of plate-shaped bodies in the tire-circumferential direction, respective first ends of the first connection plate and the second connection plate of one connection member is connected to a plurality of plate-shaped bodies adjacent to each other in the tire-circumferential direction.

In the invention, the non-pneumatic tire is configured by connecting the installation disk to the ring-shaped body through the plurality of connection members arranged in the tire-circumferential direction, and does not have a solid structure in which the inside is filled with rubber. Accordingly, it is possible to suppress an increase in weight, hardness, and rolling resistance to secure satisfactory ride qualities and handling qualities, and it is possible to prevent a blowout from occurring.

The connection member is provided, in the side view of the tire, with the first connection plate curved to protrude toward first side in the tire-circumferential direction, and the second connection plate curved to protrude toward second side. Accordingly, when the installation disk and the ring-shaped body are relatively changed in position in the tire-radial direction, the tire-circumferential direction, or the tire-widthwise direction by external force applied to the non-pneumatic tire, it is possible to easily elastically deform the first connection plates and the second connection plates. Therefore, it is possible to provide a non-pneumatic tire with flexibility, to prevent vibration from being transmitted to the vehicle, and to reliably secure satisfactory ride qualities.

Since each connection member is axisymmetrical about the imaginary line in the side view of the tire, it is possible to prevent a difference from occurring between a spring constant according to first side in the tire-circumferential direction and a spring constant according to second side in the non-pneumatic tire. Accordingly, with the non-pneumatic tire being in contact with the ground, it is possible to prevent a difference from occurring between a spring constant according to a traveling direction and a spring constant according to a braking direction at the contact part of the tire to the ground, and it is possible to reliably secure satisfactory handling qualities.

Since the ring-shaped body is divided into the plurality of plate-shaped bodies in the tire-circumferential direction, it is possible to improve flexibility of the ring-shaped body. Accordingly, it is possible to easily deform the ring-shaped body corresponding to the external force applied to the non-pneumatic tire, as well as to the first connection plates and the second connection plates. Therefore, it is possible to suppress a difference in contact pressure within the contact face of the tire to the ground, to further reliably secure satisfactory ride qualities, and to prevent side abrasion from occurring in the tread rubber.

As described above, since it is possible to easily deform the ring-shaped body, it is possible to drastically ease a load applied to the first and the second connection plates, and a load applied to the respective first ends of the first and the second connection plates connected to the ring-shaped body and the respective second ends of the first and the second connection plates connected to the installation disk, that is, the connection parts of the first and the second connection plates. Accordingly, it is possible to improve the durability of the whole connection members including the connection parts.

Since respective first ends of first and second connection plates of one connection member is connected to the plurality of plate-shaped bodies adjacent to each other in the tire-circumferential direction, the number of plate-shaped bodies constituting the ring-shaped body can be easily secured at a quantity large enough to exhibit the above-described operational effects, and it is possible to easily distribute the contact pressure applied to the tread rubber in the tire-circumferential direction, and to reliably suppress a difference in contact pressure within the contact face of the tire to the ground.

When a great number of plate-shaped bodies constituting the ring-shaped body are secured as described above, it is possible to prevent vibration occurring from the non-pneumatic tire at the time of driving. Accordingly, it is possible to secure satisfactory ride qualities, to suppress the load applied to the whole connection members and the tread rubber, and to improve durability of the whole non-pneumatic tire.

As described above, since the ring-shaped body is divided into the plurality of plate-shaped bodies in the tire-circumferential direction, it is possible to easily form a non-pneumatic tire. In addition, for example, when a part of the ring-shaped body is damaged, only the damaged part may be replaced without replacing the whole ring-shaped body, and it is possible to easily maintain the tire.

At least one group of respective first ends of the first connection plate and the second connection plate, and respective second ends of the first connection plate and the second connection plate connected to the outer circumferential face of the installation disk may be rotatably supported around the rotation axial line extending parallel to the tire-widthwise direction.

In this case, since at least one group of respective first ends of the first and the second connection plates and respective second ends of the first and the second connection plates is supported around the rotation axial line extending parallel to the tire-widthwise direction, at least one group is rotated around the rotation axial line and thus it is possible to suppress at least one group from being partially and greatly deformed when the installation disk and the ring-shaped body are relatively changed in position by the external force applied to the non-pneumatic tire as described above. The first and the second connection plates are uniformly deformed overall with little bias, and it is possible to ease the load applied to at least the one group. As described above, respective first ends of the first and the second connection plates of one connection member is connected to the plurality of plate-shaped bodies adjacent to each other in the tire-circumferential direction, and it is possible to further improve the ride qualities and durability of the whole connection members.

In the configuration in which at least one group of respective first ends of first connections plate and second connection plate and respective second ends of the first and the second connection plates is rotatably supported around the rotation axial line as described above, the number of arranged connection members may be limited due to the reason of space. When the number of arranged connection members is limited as described above and the respective first ends of the first and the second connection plates of one connection member are connected to one plate-shaped body, the number of plate-shaped bodies becomes too small and the above-described operational effects cannot be achieved.

That is, by employing the configuration in which at least one group of the respective first ends of the first and the second connection plates and the respective second ends of the first and the second connection plates is rotatably supported around the rotation axial line, it is possible to secure the number of plate-shaped bodies constituting the ring-shaped body in a quantity sufficient to exhibit the above-described operational effects by connecting the respective first ends of the first and the second connection plates of one connection member to the plurality of plate-shaped bodies adjacent to each other in the tire-circumferential direction as described above, even when the number of arranged connection members is small. That is, since the respective first ends of the first and the second connection plates of one connection member is connected to the plurality of plate-shaped bodies adjacent to each other in the tire-circumferential direction, it is possible to secure a great number of plate-shaped bodies irrespective of the number of arranged connection members.

Respective first ends of the first connection plate and the second connection plate of one connection member are separately connected at the same position in the tire-circumferential direction and at positions different from each other in the tire-widthwise direction, on an inner circumferential face of the ring-shaped body. The plurality of connection members may be arranged in the tire-circumferential direction such that the plurality of first connection plates are arranged at a first tire-widthwise position in the tire-circumferential direction and the plurality of second connection plates are arranged at a second tire-widthwise position in the tire-circumferential direction.

In this case, the respective first ends of the first and the second connection plates of one connection member are separately connected at the same position in the tire-circumferential direction and at position different from each other in the tire-widthwise direction, on the inner circumferential face of the ring-shaped body. Since the plurality of connection members are arranged in the tire-circumferential direction such that the plurality of first connection plates are arranged at the first tire-widthwise position in the tire-circumferential direction and the plurality of second connection plates are arranged at the second tire-widthwise position in the tire-circumferential direction, it is possible to suppress interference between the connection members adjacent to each other in the tire-circumferential direction. In addition, it is possible to further reliably prevent the number of arranged connection members from being limited, it is possible to further easily distribute the contact pressure applied to the tread rubber in the tire-widthwise direction, and it is possible to reliably prevent side abrasion from occurring in the tread rubber.

The first connection plates and the second connection plates may be formed of a metal or resin.

In this case, it is possible to substantially prevent hysteresis loss from occurring, and it is possible to reduce rolling resistance as compared with the pneumatic tire.

Effect of the Invention

According to the invention, it is possible to suppress an increase in weight, hardness, and rolling resistance to secure satisfactory ride qualities and handling qualities, and it is possible to prevent a blowout from occurring. In addition, it is possible to secure satisfactory handling qualities and durability, to make distribution of contact pressure uniform, and to prevent a blowout from occurring.

BRIEF DESCRIPTION OF THE DRAWINGS

FIG. 7A is a front view of a connection member and an installation disk of the non-pneumatic tire shown in FIG. 5, as viewed in a tire-widthwise direction.

FIG. 7B is a side view of FIG. 7A.

BEST MODE FOR CARRYING OUT THE INVENTION

Figure 1:
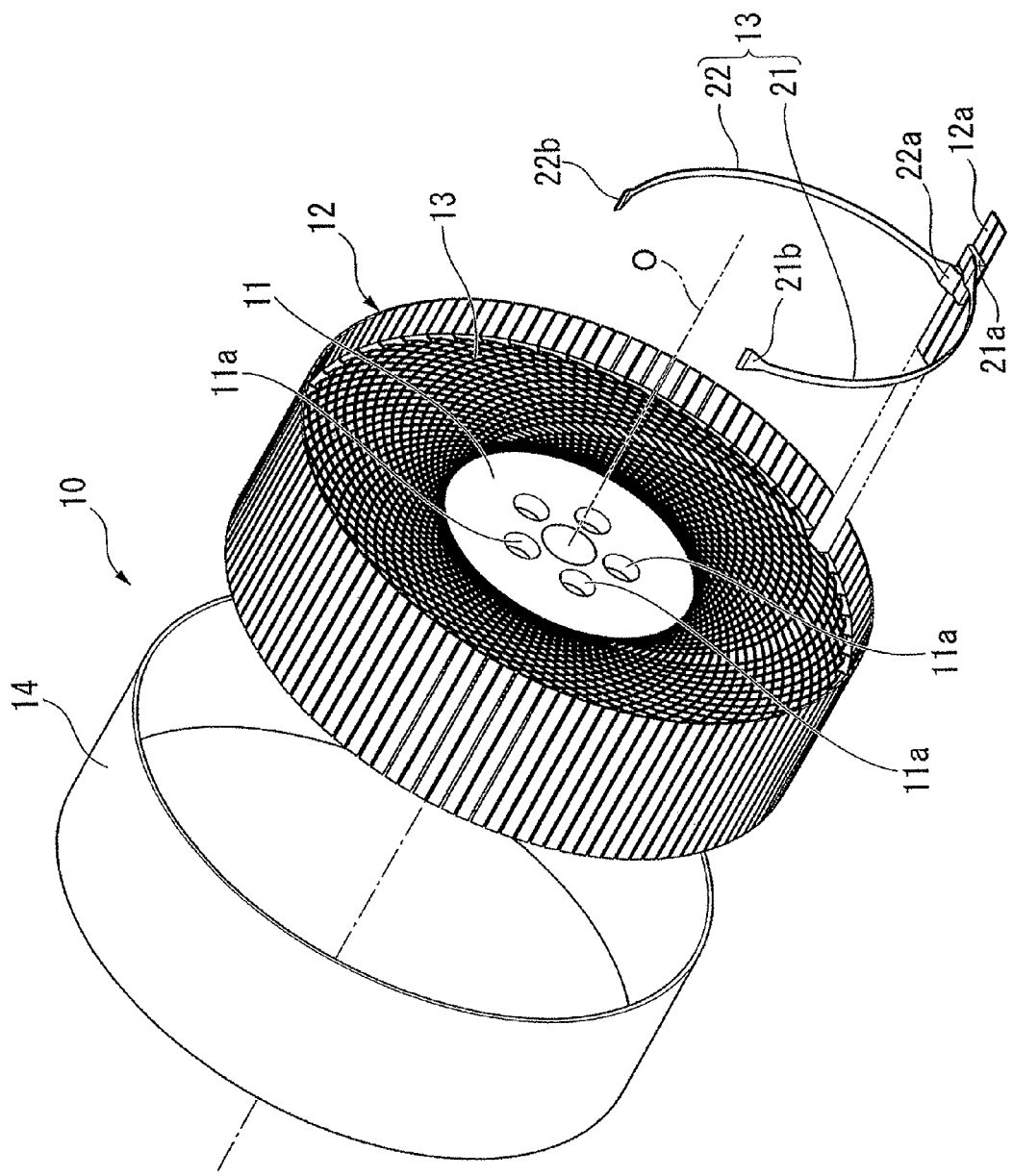
FIG. 1 is a schematic perspective view of disassembling a part of a non-pneumatic tire according to a first embodiment of the invention.

Hereinafter, a non-pneumatic tire according to a first embodiment of the invention will be described with reference to FIG. 1 to FIG. 3.

The non-pneumatic tire 10 is provided with an installation disk 11 mounted on an axle (not shown), a ring-shaped body 12 surrounding the installation disk 11 from the outside in the radial direction, a plurality of connection members 13 connecting an outer circumferential face of the installation disk 11 to an inner circumferential face of the ring-shaped body 12, and a tread rubber 14 provided over the entire outer circumferential face of the ring-shaped body 12.

The installation disk 11 has a circular shape in a side view of the non-pneumatic tire 10 from a direction of an axial line O, and a plurality of installation holes 11a are formed at the radial center. For example, bolts are inserted into such installation holes 11a, and are coupled to female screw portions formed in the axle by screws, thereby mounting the installation disk 11 on the axle. The installation disk 11 is formed of metal.

The tread rubber 14 has a cylindrical shape, and integrally covers the entire outer circumferential face of the ring-shaped body 12. A thickness of the tread rubber 14 is, for example, about 10 mm.

Each of the connection members 13 is provided with a first connection plate 21 curved to protrude toward first side in the tire-circumferential direction, and a second connection plate 22 curved to protrude toward second side, in the side view.

Respective first ends 21a and 22a of the first connection plate 21 and the second connection plate 22 of the connection member 13 are separately connected at the same position in the tire-circumferential direction and at positions different from each other in the tire-widthwise direction, on an inner circumferential face of the ring-shaped body 12.

Figure 2:
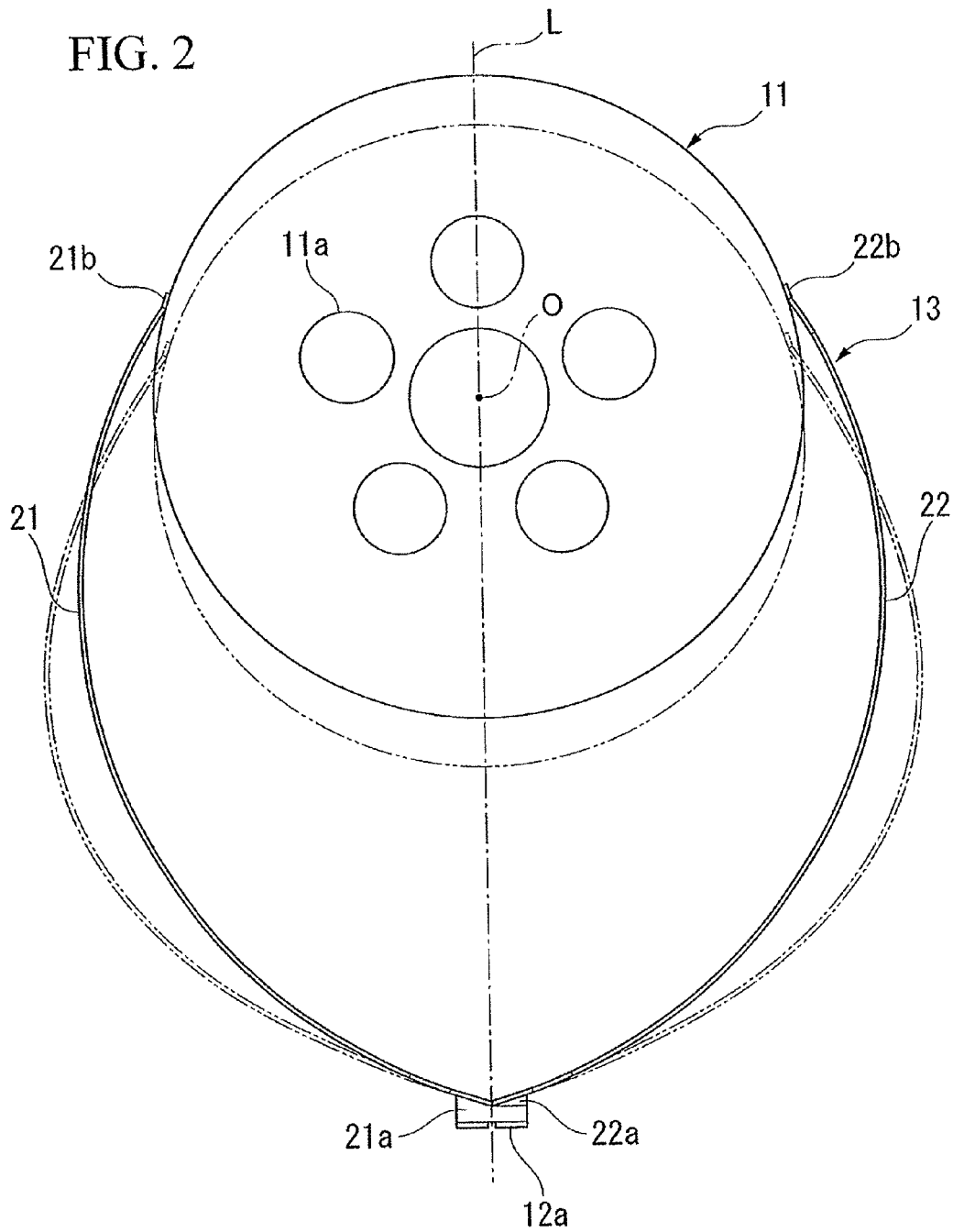
FIG. 2 is a side view of a connection member and an installation disk in the non-pneumatic tire shown in FIG. 1.

As shown in FIG. 2, the connection member 13 is axisymmetrical about an imaginary L connecting the respective first ends 21a and 22a of the first connection plate 21 and the second connection plate 22 to the axial line O in the side view and extending in the tire-radial direction.

That is, lengths of the first connection plate 21 and the second connection plate 22 are equal to each other, and the respective second ends 21b and 22b of the first connection plate 21 and the second connection plate 22 are separately connected, in the side view, from positions opposed to the respective first ends 21a and 22a in the tire-circumferential direction at positions separated by the same angle (e.g., equal to or more than 90°, preferably equal to or more than 90° and equal to or less than 120°) to the first side and the second side in the tire-circumferential direction with respect to the axial line O, on an outer circumferential face of the installation disk 11.

The plurality of connection members 13 are separately arranged at positions of point symmetry with respect to the axial line O between the installation disk 11 and the ring-shaped body 12. The plurality (60 in the shown example) of connection members 13 are arranged in the tire-circumferential direction such that a plurality of first connection plates 21 are arranged at a first tire-widthwise position in the tire-circumferential direction and a plurality of second connection plates 22 are arranged at a second tire-widthwise position different from the first tire-widthwise position in the tire-circumferential direction. All the connection members 13 have the same shape and size.

The first connection plate 21 and the second connection plate 22 have the same tire-widthwise (direction of the axial line O) size, that is, the same width (e.g., about 8 mm). The first connection plate 21 and the second connection plate 22 have the same thickness (e.g., about 2.5 mm).

In the shown example, the first end 21a and the second end 21b of the first connection plate 21 and the first end 22a and the second end 22b of the second connection plate 22 have widths larger than those of parts positioned therebetween.

The respective second ends 21b and 22b of the first connection plates 21 and the second connection plate 22 are formed of flat faces to come into contact with the outer circumferential face of the installation disk 11. The respective first ends 21a and 22a of the first connection plate 21 and the second connection plate 22 are formed of flat faces to come into contact with the inner circumferential face of the ring-shaped body 12, and have the largest thickness in the first connection plate 21 and the second connection plate 22.

In the first embodiment, the ring-shaped body 12 is divided into a plurality of plate-shaped bodies 12a in the tire-circumferential direction. The ring-shaped body 12 is formed of metal.

The respective first ends 21a and 22a of the first connection plate 21 and the second connection plate 22 are connected to a tire-widthwise direction inside of each plate-shaped body 12a. In the shown example, the respective first ends 21a and 22a of the first connection plate 21 and the second connection plate 22 are connected to each plate-shaped body 12a at positions deviating from the tire-widthwise center to the opposite vehicle side.

Peripheral edges of the plate-shaped bodies 12a adjacent to each other in the tire-circumferential direction are close to each other or in contact with each other. The first connection plates 21 adjacent to each other in the tire-circumferential direction are opposed to each other in the tire-circumferential direction, and the second connection plates 22 adjacent to each other in the tire-circumferential direction are opposed to each other in the tire circumferential direction. In the shown example, the respective second ends 21b and 22b of the first connection plate 21 and the second connection plate 22 are separately connected to both tire-widthwise ends of the outer circumferential face of the installation disk 11.

As described above, in a first connection member 13 and a second connection member 13 adjacent to each other in the tire-circumferential direction, the first connection plate 21 of the second connection member 13 is opposed substantially parallel to the first connection plate 21 of the first connection member 13 in the tire-circumferential direction between the first connection plate 21 and the second connection plate 22 of the first connection member 13, and the second connection plate 22 of the first connection member 13 is opposed substantially parallel to the second connection plate 22 of the second connection member 13 in the tire-circumferential direction between the first connection plate 21 and the second connection plate 22 of the first connection member 13.

In the first embodiment, the first connection plates 21 and the second connection plates 22 are formed of, for example, metal, resin, or the like having little hysteresis loss.

When the first connection plates 21 and the second connection plates 22 are formed of metal such as steel, stainless steel, and aluminum, the respective first ends 21a 22a of the first connection plate 21 and the second connection plate 22 and the respective second ends 21b and 22b of the first connection plate 21 and the second connection plate 22 are connected to the inner circumferential face of the ring-shaped body 12 and outer circumferential face of the installation disk 11 by welding.

When the first connection plates 21 and the second connection plates 22 are formed of resin, the respective first ends 21a and 22a of the first connection plate 21 and the second connection plate 22 and the respective second ends 21b and 22b of the first connection plate 21 and the second connection plate 22 are connected to the outer circumferential face of the installation disk 11 and the inner circumferential face of the ring-shaped body 12 by bonding with resin.

As described above, according to the non-pneumatic tire 10 of the first embodiment, the installation disk 11 and the ring-shaped body 12 are connected to each other by the connection members 13, and the non-pneumatic tire 10 does not have a solid structure in which the inside is filled with rubber. Accordingly, it is possible to suppress the increase in weight, hardness, and rolling resistance to secure satisfactory ride qualities and handling qualities, and it is possible to prevent a blowout from occurring.

Each connection member 13 is provided with the first connection plate 21 curved to protrude toward the first side in the tire-circumferential direction, and the second connection plate 22 curved to protrude toward the second side, in the side view. Accordingly, when the installation disk 11 and the ring-shaped body 12 are relatively changed in position in the tire-radial direction, the tire-circumferential direction, or the tire-widthwise direction by external force applied to the non-pneumatic tire 10, it is possible to easily elastically deform the first connection plates 21 and the second connection plates 22 corresponding to the displacement. Accordingly, it is possible to provide the non-pneumatic tire 10 with flexibility, and it is possible to reliably secure satisfactory ride qualities.

The respective first ends 21a and 22a of the first connection plate 21 and the second connection plate 22 of the connection member 13 are separately connected at the same position in the tire-circumferential direction and at positions different from each other in the tire-widthwise position on the inner circumferential face of the ring-shaped body 12. The plurality of first connection members 13 are arranged in the tire-circumferential direction such that the plurality of connection plates 21 are arranged at the first tire-widthwise position in the tire-circumferential direction and the plurality of second connection plates 22 are arranged at the second tire-widthwise position in the tire-circumferential direction. Accordingly, it is possible to suppress interference between the connection members 13 adjacent to each other in the tire-circumferential direction, and it is possible to prevent the number of arranged connection members 13 from being limited.

Since the connection member 13 is axisymmetrical about the imaginary line L in the side view, it is possible to prevent a difference from occurring between a spring constant according to the first side in the tire-circumferential direction and a spring constant according to the second side in the non-pneumatic tire 10. Accordingly, with the non-pneumatic tire 10 being in contact with the ground, it is possible to suppress a difference between a spring constant according to the traveling direction and a spring constant according to the braking direction at the contact part of the tire 10 to the ground, and it is possible to reliably secure satisfactory handling qualities.

In the first embodiment, since the ring-shaped body 12 is divided in the tire-circumferential direction, it is possible to easily form the non-pneumatic tire 10. In addition, for example, when a part of the ring-shaped body 12 is damaged, only the damaged part may be replaced without replacing the whole ring-shaped body 12, and it is possible to easily maintain the tire.

Since the ring-shaped body 12 is divided in the tire-circumferential direction, it is possible to improve flexibility of the ring-shaped body 12. In addition, it is possible to easily deform the ring-shaped body 12 corresponding to external force applied to the non-pneumatic tire 10, and it is possible to further reliably secure the satisfactory ride qualities.

In the first embodiment, since the first connection plates 21 and the second connection plates 22 are formed of metal or resin, it is possible to prevent hysteresis loss from occurring in the non-pneumatic tire 10 and it is possible to reduce rolling resistance as compared with the pneumatic tire.

The technical scope of the invention is not limited to the embodiment, and can be variously modified in the scope which does not deviate from the concept of the invention.

For example, in the first embodiment, one first connection plate 21 and one second connection plate 22 are provided as the connection member 13, but instead, one connection member 13 may be provided with a plurality of first connection plates 21 and a plurality of second connection plates 22 at positions different from each other in the tire-widthwise direction.

Figure 4:
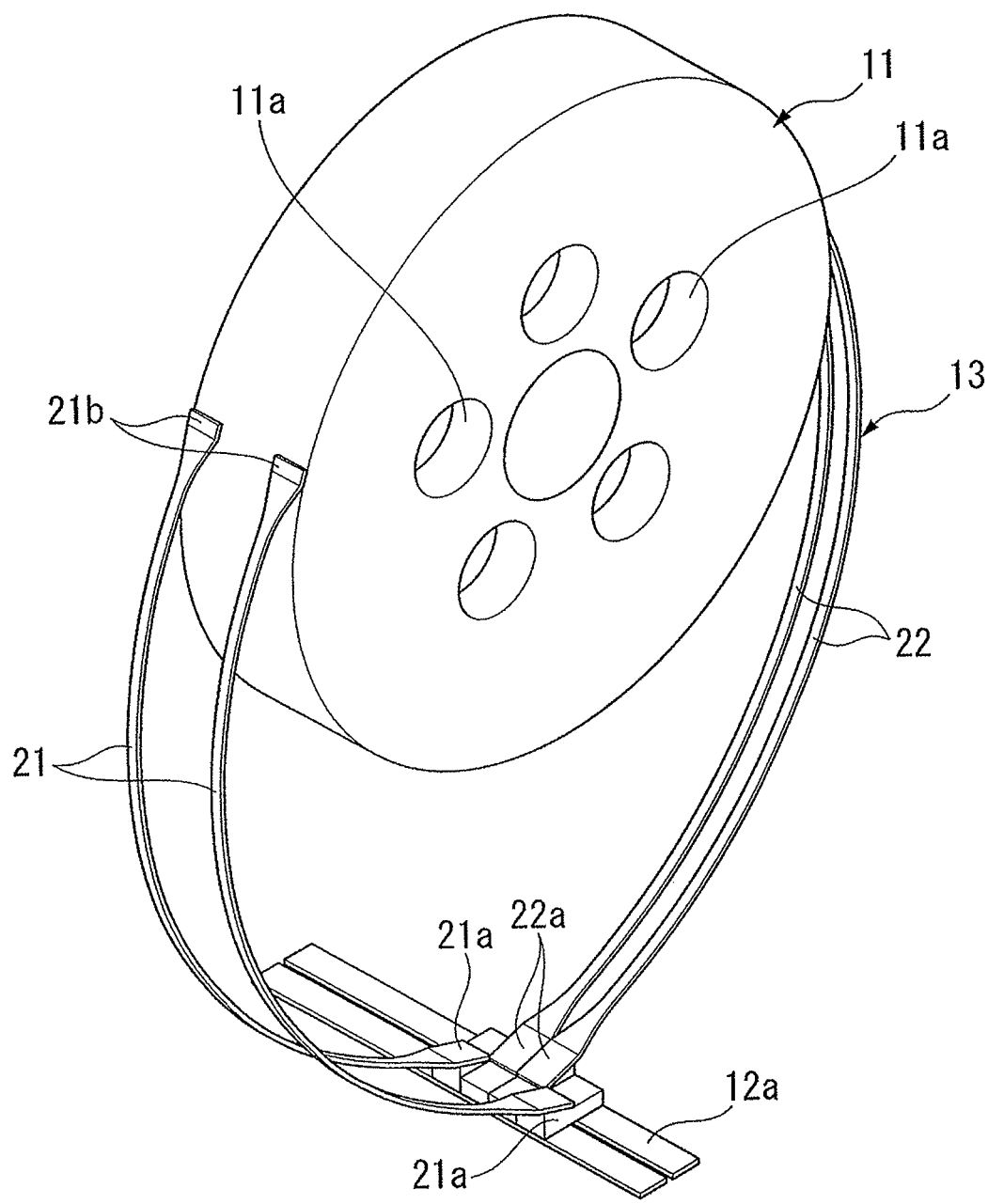
FIG. 4 is a schematic perspective view illustrating a part of a non-pneumatic tire according to another embodiment of the invention.
Figure 5:
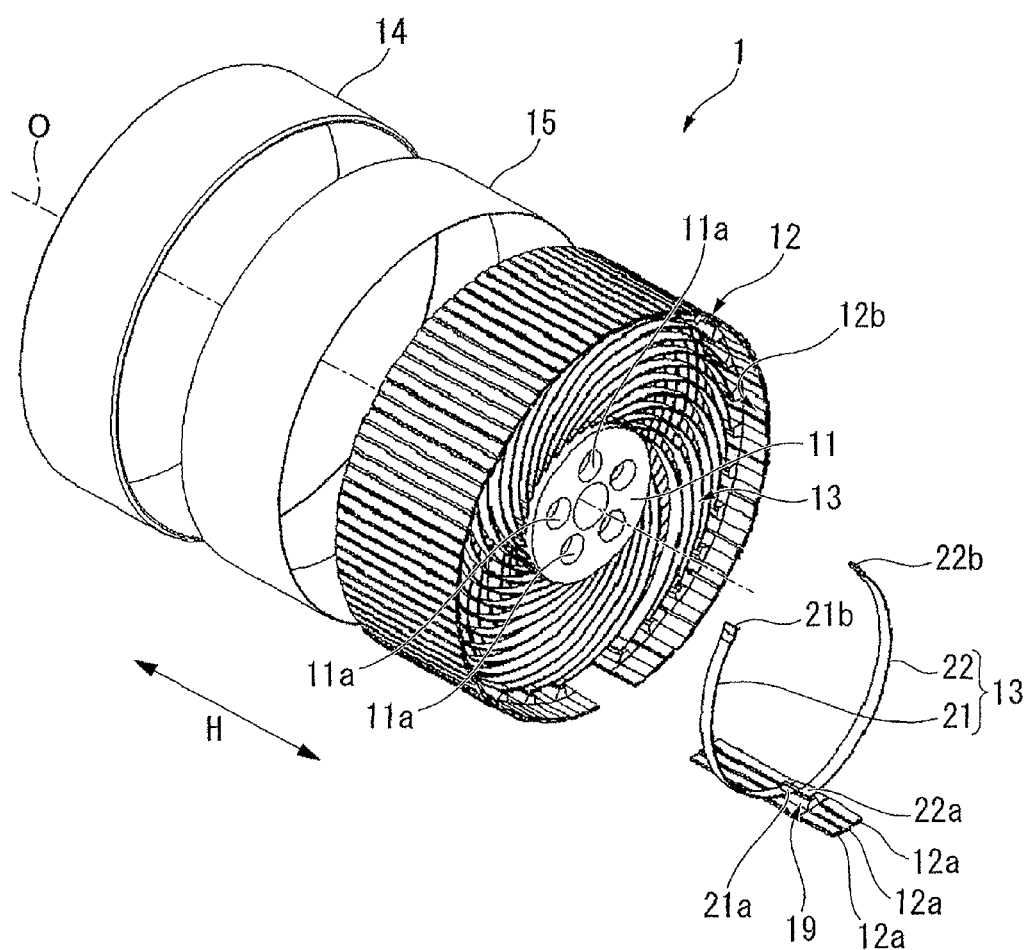
FIG. 5 is a schematic perspective view of disassembling a part of a non-pneumatic tire according to a second embodiment of the invention.
Figure 6:
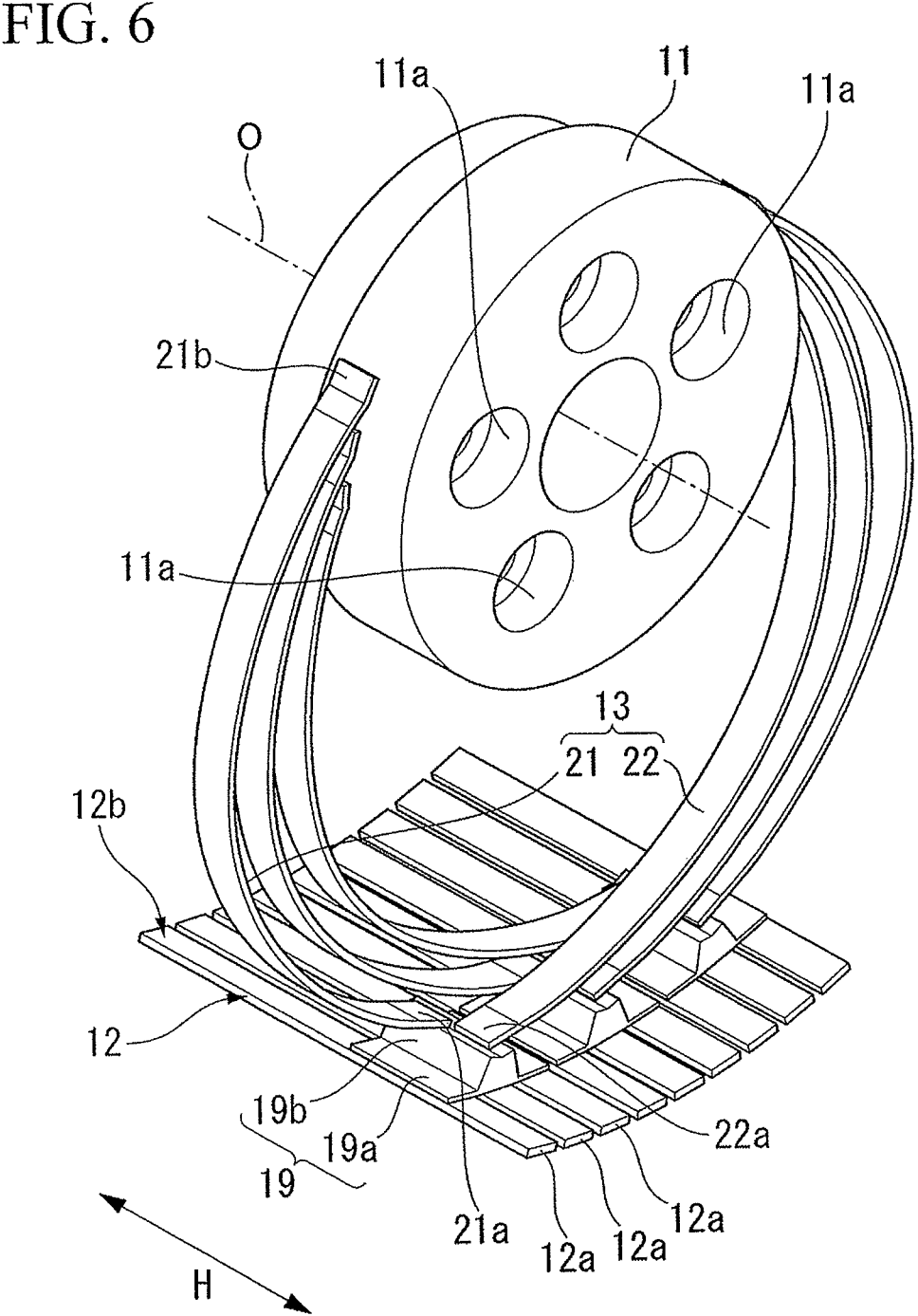
FIG. 6 is a schematic perspective view illustrating a part of the non-pneumatic tire shown in FIG. 5.
Figure 8:
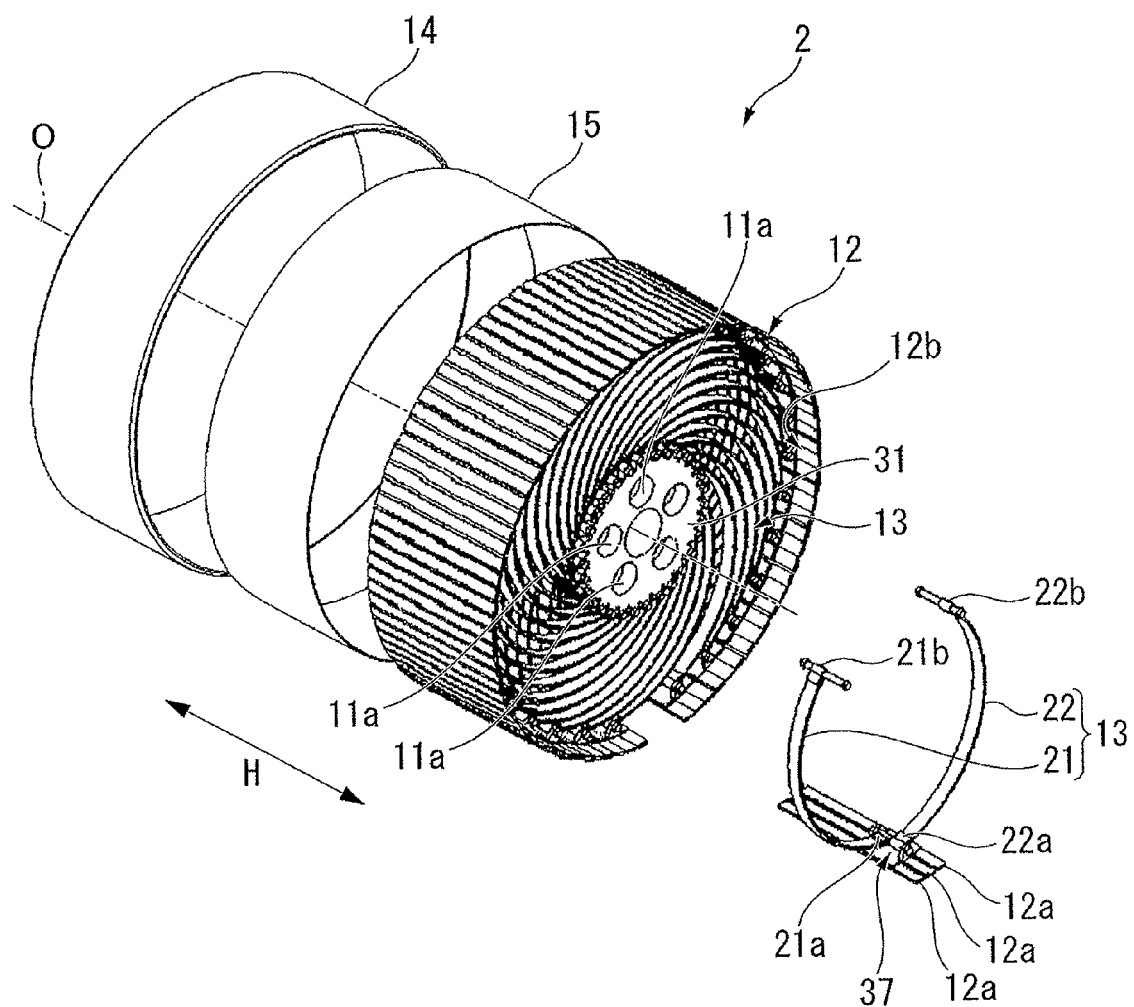
FIG. 8 is a schematic perspective view of disassembling a part of a non-pneumatic tire according to a third embodiment of the invention.
Figure 9:
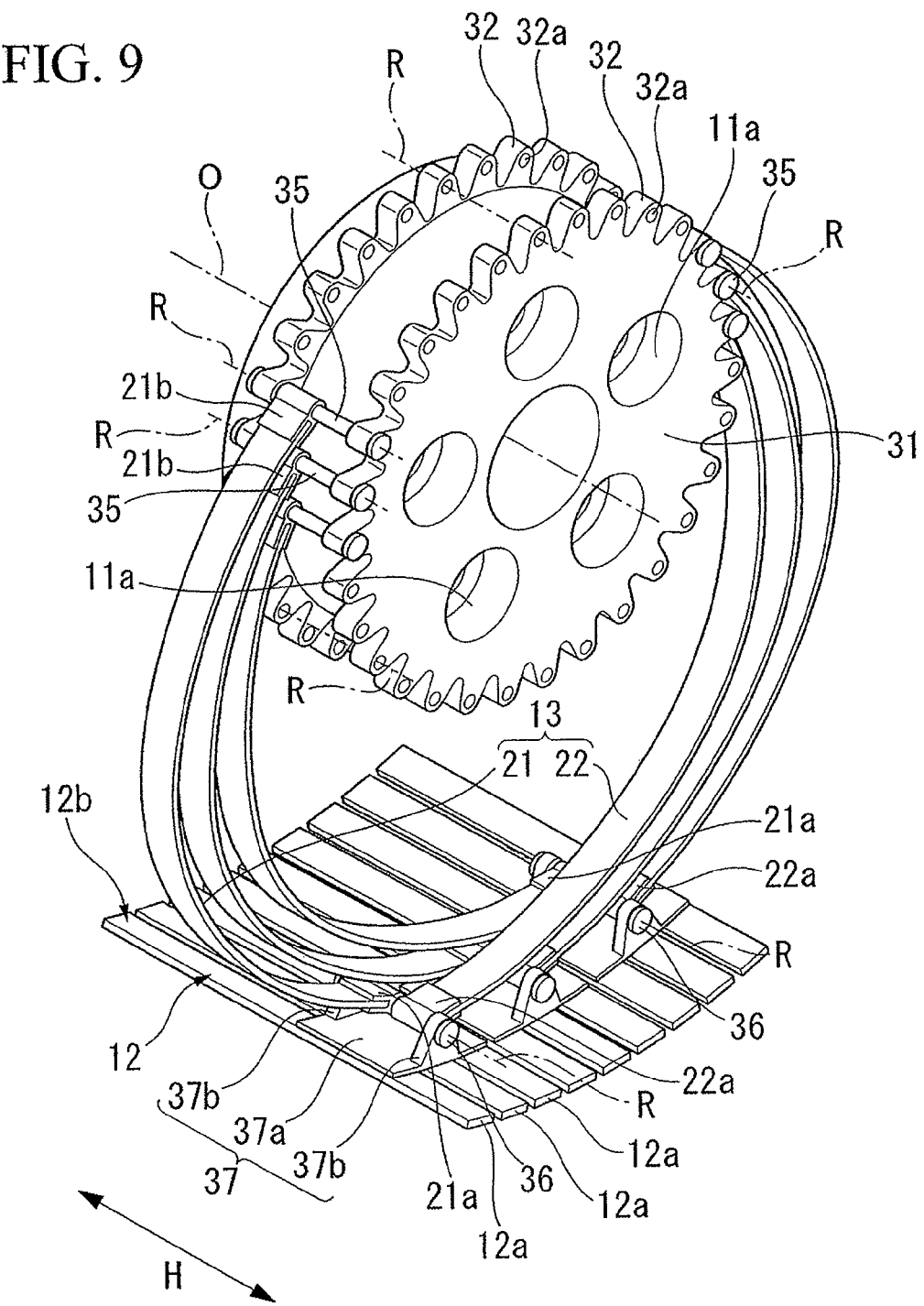
FIG. 9 is a schematic perspective view illustrating a part of the non-pneumatic tire shown in FIG. 8.
Figure 10A:
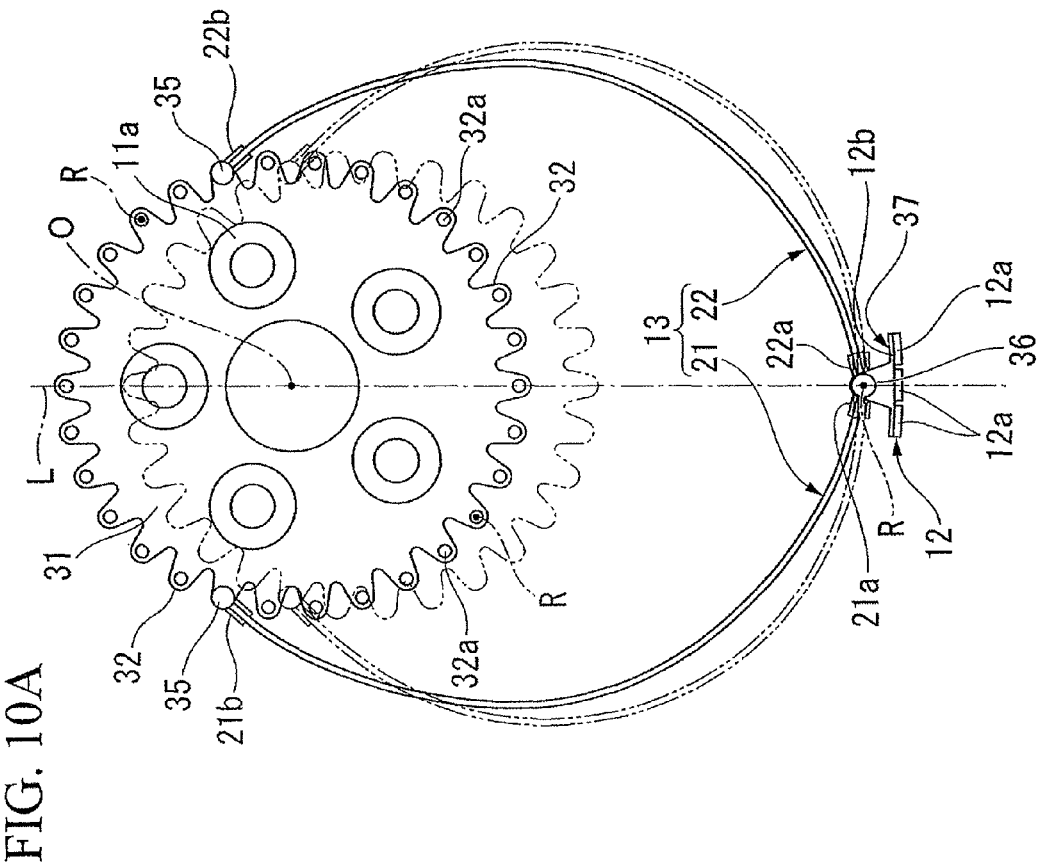
FIG. 10A is a front view of a connection member and an installation disk of the non-pneumatic tire shown in FIG. 8, as viewed in a tire-widthwise direction.
Figure 10B:
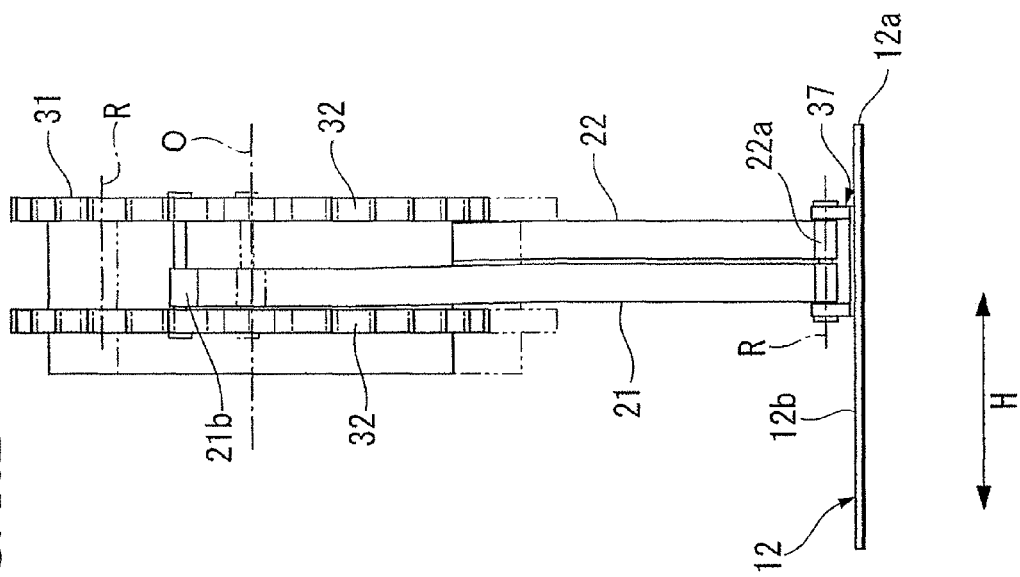
FIG. 10B is a side view of FIG. 10A

For example, as shown in FIG. 4, one connection member 13 may be provided with two first connection plates 21 at a distance from each other in the tire-widthwise direction, and two second connection plates 22 between such first connection plates 21 in the tire-widthwise direction.

In this configuration, one second connection plate formed to be wide may be provided between two first connection plates 21, instead of providing two second connection plates 22.

The plurality of connection members 13 may be arranged between the installation disk 11 and the ring-shaped body 12 in the tire-widthwise direction.

In the first embodiment, the ring-shaped body 12 is divided into the plurality of plate-shaped bodies 12a in the tire-circumferential direction, but instead, a ring shaped body formed overall in one cylindrical shape may be employed.

The materials for forming the first connection plates 21 and the second connection plates 22 are not limited to the first embodiment but may be appropriately modified.

The respective second ends 21b and 22b of the first connection plate 21 and the second connection plate 22 may be separately connected, for example, at opposite positions with the axial line O interposed therebetween in the tire-radial direction on the outer circumferential face of the installation disk 11 instead of the first embodiment, or may be connected to positions opposed to the respective first ends 21a and 22a of the first connection plate 21 and the second connection plate 22 in the tire-radial direction on the outer circumferential face of the installation disk 11.

Subsequently, a verification test of the above-described operational effects was conducted.

A pneumatic tire (charged internal pressure: 230 kPa) with a size of 195/55 R16 of the conventional example was set as the assessment standard (100), non-pneumatic tires with the same size as the example and the comparative example were assessed on the basis of numerical indexes of weight, rolling resistance, ride qualities, handling qualities, spring constant (spring constant in the traveling direction) according to the first side in the tire-circumferential direction, and spring constant (spring constant in the braking direction) according to the second side.

Figure 3:
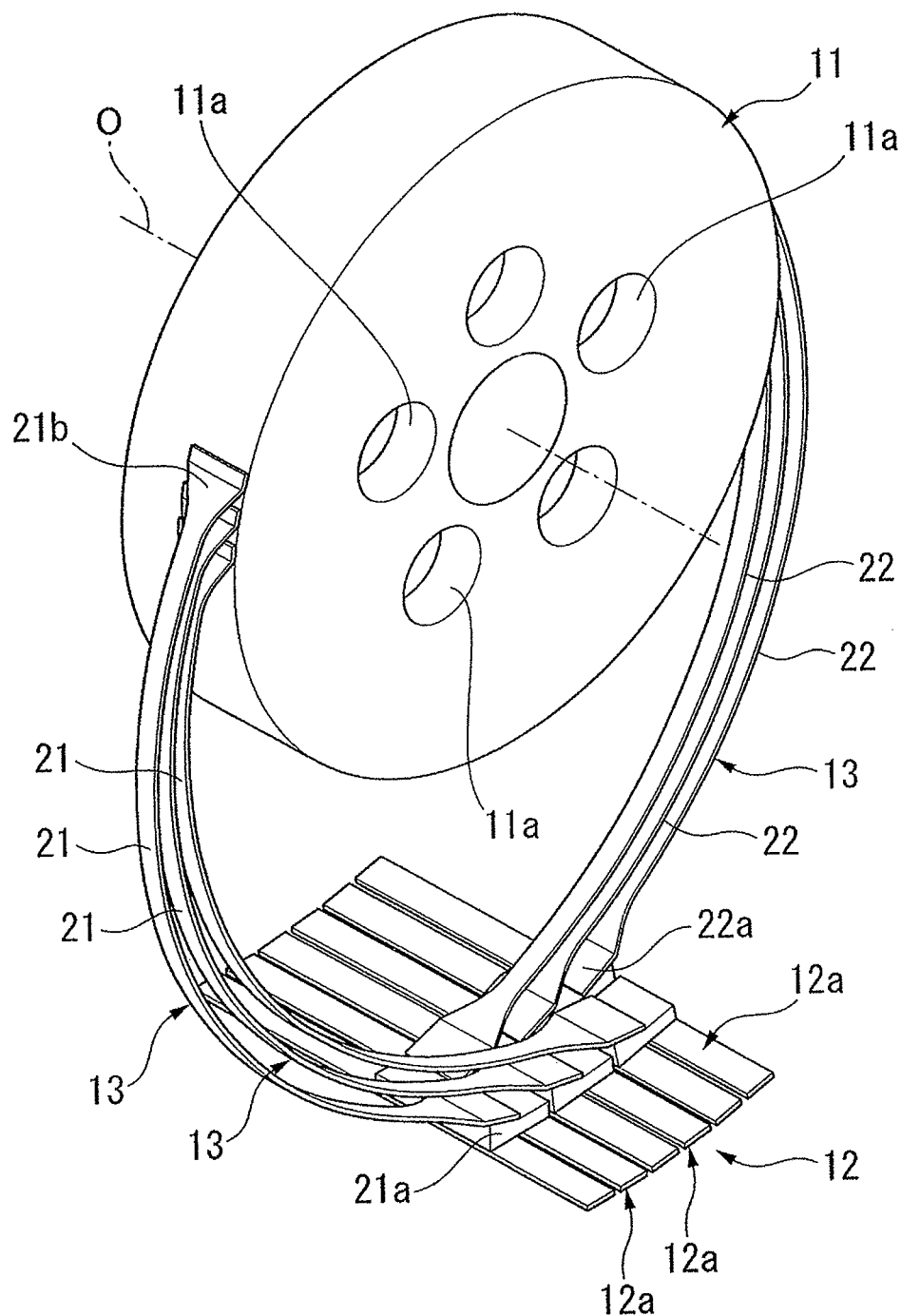
FIG. 3 is a schematic perspective view illustrating a part of the non-pneumatic tire shown in FIG. 1.

The non-pneumatic tire of the example employed the configurations shown in FIG. 1 to FIG. 3, and the non-pneumatic tire of the comparative example employed a configuration in which the second connection plates 22 were not provided as compared with the non-pneumatic tire 10 of the example, and the width of the first connection plates was larger (20 mm) than the width of the first connection plates 21 of the non-pneumatic tire 10. The connection members, the ring-shaped bodies, and the installation disks of the non-pneumatic tires of the example and the comparative example were formed of stainless steel.

As for the rolling resistance, when rotating the tires of the example, the comparative example, and the conventional example at a speed of 80 km/h with the tire closely pressed onto a drum of a drum tester by a force of 4.0 kN, resistance applied to a drum shaft was measured.

The spring constants were measured on the basis of force and movement (deformation of tire) when a rigid plate is pressed in a direction along the tire-circumferential direction among the directions, which are perpendicular to a direction of closely pressing the tire to the rigid plate, with the tires of the example, the comparative example, and the conventional example closely pressed onto the rigid plate by a force of 4.0 kN.

The ride qualities and the handling qualities were assessed on the basis of the driver's feeling, when the tires of the example, the comparative example, and the conventional example were mounted on a vehicle and two people rode the vehicle to drive the vehicle.

The result is shown in Table 1.

This table shows that the weight and the rolling resistance are lower as the values thereof are smaller, the ride qualities and the handling qualities are more satisfactory as the values thereof are larger, and the spring constant is larger as the value thereof is larger.

TABLE 1

|  | Weight | Rolling Resistance | Ride Qualities | Handling Qualities | Spring Constant in Traveling Direction | Spring Constant in Braking Direction |
|---|---|---|---|---|---|---|
| Example | 103 | 80 | 98 | 100 | 102 | 102 |
| Comparative Example | 101 | 80 | 98 | 90 | 83 | 107 |
| Conventional Example | 100 | 100 | 100 | 100 | 100 | 100 |

As a result, in the non-pneumatic tire of the example, it was confirmed that it was possible to suppress the increase in weight and to reduce rolling resistance as compared with the pneumatic tire of the conventional example.

As for the ride qualities and the handling qualities, in the non-pneumatic tire of the example, it was confirmed that it was possible to suppress a decrease in ride qualities and to keep the handling qualities equivalent to that of the pneumatic tire of the conventional example.

In the non-pneumatic tire of the example, it was confirmed that it was possible to suppress an increase of the spring constants and to keep such spring constants equal to each other similar to the pneumatic tire of the conventional example. Meanwhile, in the non-pneumatic tire of the comparative example, it was confirmed that a difference between the spring constants is large and the handling qualities were thereby drastically decreased.

Hereinafter, a non-pneumatic tire according to a second embodiment of the invention will be described with reference to FIG. 5 to FIG. 7B.

The non-pneumatic tire 1 is provided with an installation disk 11 mounted on an axle (not shown), a ring-shaped body 12 surrounding the installation disk 11 from the outside in the tire-radial direction, a plurality of connection members 13 connecting an outer circumferential face of the installation disk 11 to an inner circumferential face 12b of the ring-shaped body 12, a tread rubber 14 provided over the entire outer circumferential face of the ring-shaped body 12, and a reinforcement layer 15 provided between the ring-shaped body 12 and the tread rubber 14.

The installation disk 11 has a circular shape in a side view of the non-pneumatic tire 1 from a direction of an axial line O, and a plurality of installation holes 11a are formed at a radial center portion. For example, bolts are inserted into such installation holes 11a, and coupled to female screw portions formed in the axle by screws, thereby mounting the installation disk 11 on the axle. The installation disk 11 is formed of metal in a disk-shaped plate.

The tread rubber 14 has a cylindrical shape, and integrally covers the entire outer circumferential face of the ring-shaped body 12. The thickness of the tread rubber 14 is, for example, about 10 mm.

The reinforcement layer 15 has a configuration in which a plurality of steel cords is embedded abreast in a cylindrical rubber sheet. The reinforcement layer 15 may be formed integrally with the tread rubber 14 by embedding the plurality of steel cords side by side in the tread rubber 14.

Each of the connection members 13 is provided with a first connection plate 21 curved to protrude toward a first side in the tire-circumferential direction, and a second connection plate 22 curved to protrude toward a second side, in the side view of the tire. Respective first ends 21a and 22a of the first connection plate 21 and the second connection plate 22 of one connection member 13 are separately connected at the same position in the tire-circumferential direction, on an inner circumferential face 12b of the ring-shaped body 12. In the second embodiment, the respective first ends 21a and 22a are separately connected at positions different from each other in the tire-widthwise direction H, on the inner circumferential face 12b of the ring-shaped body 12.

As shown in FIG. 7A, the shape of each connection member 13 in the side view of the tire is axisymmetrical about an imaginary line L extending in the tire-radial direction through the tire-circumferential center of the connection member 13. In the shown example, the imaginary line L connects the respective first ends 21a and 22a of the first and the second connection plates 21 and 22 to the axial line O.

That is, lengths of the first and the second connection plates 21 and 22 are equal to each other, and the respective second ends 21b and 22b of the first and the second connection plates 21 and 22 are separately connected, in the side view of the tire, from positions opposed to the respective first ends 21a and 22a in the tire-circumferential direction at positions separated by the same angle (e.g., equal to or more than 45° and equal to or less than 135°, preferably equal to or more than 90° and equal to less than) 120° to a first side and a second side in the tire-circumferential direction with respect to the axial line O, on an outer circumferential face of the installation disk 11.

The plurality of connection members 13 are separately arranged at positions of point symmetry with respect to the axial line O between the installation disk 11 and the ring-shaped body 12. The plurality (60 in the shown example) of connection members 13 are arranged in the tire-circumferential direction such that a plurality of first connection plates 21 are arranged at a first tire-widthwise H position in the tire-circumferential direction and a plurality of second connection plates 22 are arranged at the other tire-widthwise H position different from the first tire-widthwise H position in the tire-circumferential direction. All the connection members 13 have the same shape and size.

The first connection plates 21 adjacent to each other in the tire-circumferential direction are opposed substantially parallel to each other in the tire-circumferential direction, and the second connection plates 22 adjacent to each other in the tire-circumferential direction are also opposed substantially parallel to each other in the tire circumferential direction. In the shown example, the respective second ends 21b and 22b of the first and the second connection plates 21 and 22 are separately connected to both tire-widthwise H ends of the outer circumferential face of the installation disk 11.

The first connection plate 21 and the second connection plate 22 have the same tire-widthwise H (direction in the axial line O) size, that is, the same width. The first connection plate 21 and the second connection plate 22 have the same thickness. Accordingly, the respective second ends 21b and 22b of the first and the second connection plates 21 and 22 are connected so as to circumscribe the outer circumferential face of the installation disk 11.

In the second embodiment, the ring-shaped body 12 is divided into a plurality of plate-shaped bodies 12a in the tire-circumferential direction. The plate-shaped bodies 12a are formed of metal. Peripheral edges of the plate-shaped bodies 12a adjacent to each other in the tire-circumferential direction are close to each other or in contact with each other. The respective first ends 21a and 22a of the first and the second connection plates 21 and 22 of one connection member 13 is connected to the plurality (3 in the shown example) of plate-shaped bodies 12a adjacent to each other in the tire-circumferential direction. In the shown example, the respective first ends 21a and 22a of the first and the second connection plates 21 and 22 of one connection member 13 are connected at a position deviating from the tire-widthwise H center to the other end side (opposite to a vehicle side) on the inner circumferential face 12b of the ring-shaped body 12. The size of the plate-shaped body 12a in the tire-circumferential direction is, for example, about ⅒ of the size in the tire-widthwise direction H.

An installation member 19 provided with a flat plate 19a and a block-shaped body 19b provided at the tire-circumferential direction center on a surface of the flat plate 19a is bonded onto a surface constituting the inner circumferential face 12b of the ring-shaped body 12 in the plurality of plate-shaped bodies 12a adjacent to each other in the tire-circumferential direction, and the plurality of plate-shaped bodies 12a adjacent to each other in the tire-circumferential direction are connected by the installation member 19. The installation member 19 is bonded to a position deviating from the tire-widthwise H center on the surface of the plate-shaped body 12a. The respective first ends 21a and 22a of the first and the second connection plates 21 and 22 of one connection member 13 are connected onto a surface of the block-shaped body 19b facing the inside in the tire-radial direction so as to circumscribe the surface of the block-shaped body 19b.

In the shown example, the size of the installation disk 11 in the tire-widthwise direction H is about a half of the size of the ring-shaped body 12 in the tire-widthwise direction H. Accordingly, when the non-pneumatic tire 1 is mounted on the vehicle with one tire-widthwise H end positioned toward the vehicle and the other tire-widthwise H end positioned away from the vehicle, a space for housing a brake or the like is secured at a position toward the vehicle from the installation disk 11 in the inside of the ring-shaped body 12 in the tire-radial direction.

In the second embodiment, the first connection plate 21 and the second connection plate 22 are formed of, for example, a metal or resin having little hysteresis loss.

When the first connection plate 21 and the second connection plate 22 are formed of a metal such as steel, stainless steel, or aluminum, the first end 21a and the second end 21b of the first connection plate 21 and the first end 22a and the second end 22b of the second connection plate 22 are connected to the block-shaped body 19b (the inner circumferential face 12b side of the ring-shaped body 12) and the outer circumferential face of the installation disk 11 by welding or by coupling with coupling members.

When the first connection plates 21 and the second connection plates 22 are formed of resin, the first end 21a and the second end 21b of the first connection plate 21 and the first end 22a and the second end 22b of the second connection plate 22 are connected to the block-shaped body 19b (the inner circumferential face 12b side of the ring-shaped body 12) and the outer circumferential face of the installation disk 11 by bonding or by coupling with coupling members.

As described above, according to the non-pneumatic tire 1 of the second embodiment, the installation disk 11 and the ring-shaped body 12 are connected to each other by the plurality of connection members 13 arranged in the tire circumferential direction, and the non-pneumatic tire 1 does not have a solid structure in which the inside is filled with rubber. Accordingly, it is possible to suppress an increase in weight, hardness, and rolling resistance to secure satisfactory ride qualities and handling qualities, and it is possible to prevent a blowout from occurring.

The connection member 13 is provided with the first connection plate 21 curved to protrude toward the first side in the tire-circumferential direction, and the second connection plate 22 curved to protrude toward the second side, in the side view. Accordingly, when the installation disk 11 and the ring-shaped body 12 are relatively changed in position in the tire-radial direction, the tire-circumferential direction, or the tire-widthwise direction H, by external force applied to the non-pneumatic tire 1, it is possible to easily elastically deform the first connection plate 21 and the second connection plate 22 corresponding to the displacement. Accordingly, it is possible to provide the non-pneumatic tire 1 with flexibility, and it is possible to prevent vibration from being transmitted to the vehicle and to reliably secure satisfactory ride qualities.

Since the connection member 13 is axisymmetrical about the imaginary line L in the side view, it is possible to prevent a difference from occurring between a spring constant according to the first side in the tire-circumferential direction and a spring constant according to the second side in the non-pneumatic tire 1. Accordingly, with the non-pneumatic tire 1 being in contact with the ground, it is possible to suppress a difference between a spring constant according to the traveling direction and a spring constant according to the braking direction at the contact part of the tire 1 to the ground, and it is possible to reliably secure satisfactory handling qualities.

Since the ring-shaped body 12 is divided into the plurality of plate shaped bodies 12a in the tire-circumferential direction, it is possible to improve the flexibility of the ring-shaped body 12. In addition, it is possible to easily deform not only the first connection plates 21 and the second connection plates 22 but also the ring-shaped body 12 corresponding to external force applied to the non-pneumatic tire 1. Accordingly, it is possible to suppress a difference in contact pressure within the contact face of the tire 1 to the ground, to further reliably secure satisfactory ride qualities, and to prevent side abrasion from occurring in the tread rubber 14.

As described above, since it is possible to easily deform the ring-shaped body 12, it is possible to drastically ease not only the load applied to the first and the second connection plates 21 and 22, but also the load applied to the respective first ends 21a and 22a of the first and the second connection plates 21 and 22 connected to the ring-shaped body 12 and the respective second ends 21b and 22b of the first and the second connection plates 21 and 22 connected to the installation disk 11, that is, the connection parts of the first and the second connection plates 21 and 22. Accordingly, it is possible to improve the durability of the whole connection members 13 including the connection parts.

Since the respective first ends 21a and 22a of the first and the second connection plates 21 and 22 of one connection member 13 is connected to the plurality of plate-shaped bodies 12a adjacent to each other in the tire-circumferential direction, the number of plate-shaped bodies 12a constituting the ring-shaped body 12 can be easily secured in a quantity sufficient to exhibit the above-described operational effects, and it is possible to easily distribute the contact pressure applied to the tread rubber 14 in the tire-circumferential direction, and to reliably suppress a difference in contact pressure within the contact face of the tire 1 to the ground.

When a great number of plate-shaped bodies 12a constituting the ring-shaped body 12 are secured as described above, it is possible to prevent vibration from occurring in the non-pneumatic tire 1 at the time of driving. Accordingly, it is possible to secure satisfactory ride qualities, to suppress the load applied to the whole connection members 13 and the tread rubber 14 and to improve the durability of the whole non-pneumatic tire 1.

As described above, since the ring-shaped body 12 is divided into the plurality of plate-shaped bodies 12a in the tire-circumferential direction, it is possible to easily form the non-pneumatic tire 1. In addition, for example, when a part of the ring-shaped body 12 is damaged, only the damaged part may be replaced without replacing the whole ring-shaped body 12, and it is possible to easily maintain the tire.

In addition, the respective first ends 21a and 22a of the first and the second connection plates 21 and 22 of one connection member 13 are separately connected at the same position in the tire-circumferential direction and at positions different from each other in the tire-widthwise direction H, on the inner circumferential face 12b of the ring-shaped body 12. Since the plurality of connection members 13 are arranged in the tire-circumferential direction such that the plurality of first connection plates 21 are arranged at the first tire-widthwise position in the tire-circumferential direction and the plurality of second connection plates 22 are arranged at the second tire-widthwise position in the tire-circumferential direction, it is possible to suppress interference between the connection members 13 adjacent to each other in the tire-circumferential direction. In addition, it is possible to further reliably prevent a limit from occurring in the number of arranged connection members, it is possible to further easily distribute the contact pressure applied to the tread rubber 14 in the tire-widthwise direction H, and it is possible to reliably prevent side abrasion from occurring in the tread rubber 14.

Since the first connection plates 21 and the second connection plates 22 may be formed of metal or resin, it is possible to substantially prevent hysteresis loss from occurring and to reduce rolling resistance as compared with the pneumatic tire.

A non-pneumatic tire according to a third embodiment of the invention will be described with reference to FIG. 8 to FIG. 10B, the same referential numerals and signs are given to the same parts as those of the second embodiment, the description thereof is not repeated, and only different parts will be described.

In the non-pneumatic tire 2, the first end 21a and the second end 21b of the first connection plate 21 and the first end 22a and the second end 22b of the second connection plate 22 are rotatably supported around a rotation axial line R extending parallel to the tire-widthwise direction H.

A plurality of first support protrusions 32 protruding toward the outside in the tire-radial direction are arranged at both tire-widthwise H ends on the outer circumferential face of the installation disk 31 at the same interval in the tire-circumferential direction, and each of the first support protrusions 32 is provided with a first bearing hole 32a penetrating in the tire-widthwise direction H.

The first support protrusions 32 formed at both tire-widthwise H ends on the outer circumferential face of the installation disk 31 are opposed to each other in the tire-widthwise direction H, and the first bearing holes 32a formed in the first support protrusions 32 are positioned at the same axis as the rotation axial line R.

The installation member 37 is provided with a flat plate 37a bonded to the plurality of plate-shaped bodies 12a, and a pair of second support protrusions 37b provided to protrude from the surface of the flat plate 37a at a distance from each other in the tire-widthwise direction H. The second support protrusion 37b is provided with a second bearing hole penetrating the tire-widthwise direction H. The second bearing holes are positioned at the same axis as the rotation axial line R.

In the third embodiment, each of the respective second ends 21b and 22b of the first and second connection plates 21 and 22 is provided with a first shaft portion 35 extending parallel to the tire-widthwise direction H, and both ends of the first shaft portion 35 protrude more toward the outside of the tire-widthwise direction H than the connection plates 21 and 22. In the third embodiment, each of the respective first ends 21a and 22a of the first and the second connection plates 21 and 22 is connected through a second shaft portion 36 extending in the tire-widthwise direction H. Both ends of the second shaft portion 36 protrude more toward the outside of the tire-widthwise direction H than the first and the second connection plates 21 and 22.

Both ends of the first shaft portion 35 are rotatably inserted into the first bearing holes 32a, and both ends of the second shaft portion 36 are rotatably inserted into the second bearing holes.

As described above, according to the non-pneumatic tire 2 of the third embodiment, the first end 21a and the second end 21b of the first connection plate 21 and the first end 22a and the second end 22b of the second connection plate 22 (hereinafter, referred to as connection parts) are rotatably supported around the rotation axial line R. Therefore, when the installation disk 31 and the ring-shaped body 12 are relatively changed in position in the tire-radial direction, the tire-circumferential direction, or the tire-widthwise direction H by external force applied to the non-pneumatic tire 2, it is possible to prevent the connection parts from being partially and greatly deformed, by rotating the connection parts of the first and the second connection plates 21 and 22 around the rotation axial line R. Accordingly, the first and the second connection plates 21 and 22 are uniformly deformed overall with little bias, and it is possible to ease the load applied to the connection parts. The respective first ends 21a and 22a of the first and the second connection plates 21 and 22 of one connection member 13 are connected to the plurality of plate-shaped bodies 12a adjacent to each other in the tire-circumferential direction, and it is possible to further improve ride qualities and durability of the whole connection members 13.

In the configuration in which the connection parts of the first and the second connection plates 21 and 22 are rotatably supported around the rotation axial line R, the number of arranged connection member 13 may be limited due to the reason of space. When the number of arranged connection members 13 is limited as described above and the respective first ends 21a and 22a of the first and the second connection plates 21 and 22 of one connection member 13 are connected to one plate-shaped body 12a, the number of plate-shaped bodies 12a becomes too small and the above-described operational effects cannot be achieved.

That is, by employing the configuration in which the connection parts of the first and the second connection plates 21 and 22 are rotatably supported around the rotation axial line R, it is possible to secure the number of plate-shaped bodies 12a constituting the ring-shaped body 12 in a quantity sufficient to exhibit the above-described operational effects by connecting the respective first ends 21a and 22a of the first and the second connection plates 21 and 22 of one connection member 13 to the plurality of plate-shaped bodies 12a adjacent to each other in the tire-circumferential direction as described above, even when the number of arranged connection members 13 is small. That is, since each of the respective first ends 21a and 22a of the first and the second connection plates 21 and 22 of one connection member 13 is connected to the plurality of plate-shaped bodies 12a adjacent to each other in the tire-circumferential direction, it is possible to secure a great number of plate-shaped bodies 12a irrespective of the number of arranged connection members 13.

The technical scope of the invention is not limited to the embodiment, and can be variously modified in the scope which does not deviate from the concept of the invention.

For example, in the third embodiment, one first connection plate 21 and one second connection plate 22 are provided as the connection member 13, but instead, one connection member 13 may be provided with a plurality of first connection plates 21 and a plurality of second connection plates 22 at positions different from each other in the tire-widthwise direction H.

The plurality of connection members 13 may be arranged between the installation disk 11 and the ring-shaped body 12 along the tire-widthwise direction H.

A disk-shaped body has been described as the installation disk 11 or 31, for example, a ring-shaped body or the like may be employed instead.

The materials for forming the first connection plates 21 and the second connection plates 22 are not limited to the third embodiment but may be appropriately modified.

The respective second ends 21b and 22b of the first connection plate 21 and the second connection plate 22 may be separately connected, for example, at opposite positions with the axial line O interposed therebetween in the tire-radial direction on the outer circumferential face of the installation disk 11 or 31 instead of the third embodiment, or may be connected to the respective first ends 21a and 22a of the first connection plate 21 and the second connection plate 22 at positions opposed in the tire-radial direction on the outer circumferential face of the installation disk 11 or 31.

In the third embodiment, the configuration has been described in which both groups of the respective first ends 21a and 22a of the first and the second connection plates 21 and 22 and the respective second ends 22b and 22b of the first and the second connection plates 21 and 22 is rotatably supported around the rotation axial line R, but at least one group of the first ends 21a and 22a and the second ends 22b and 22b may be rotatably supported around the rotation axial line R.

Instead of the third embodiment, the respective first ends 21a and 22a of the first and the second connection plates 21 and 22 may be connected onto the inner circumferential face 12b of the ring-shaped body 12 at positions different from each other in the tire-circumferential direction.

Next, a verification test of the above-described operational effects was conducted.

The non-pneumatic tire 1 shown in FIG. 5 to FIG. 7B was employed as the example 1, and the non-pneumatic tire 2 shown in FIG. 8 to FIG. 10B was employed as the example 2.

A configuration in which the respective first ends 21a and 22a of the first and the second connection plates 21 and 22 of one connection member 13 are connected to one plate-shaped body integrally formed of three plate-shaped bodies 12a in the non-pneumatic tire 1 of the example 1 was employed as the comparative example 1, and a configuration in which the respective first ends 21a and 22a of the first and the second connection plates 21 and 22 of one connection member 13 are connected to one plate-shaped body integrally formed of three plate-shaped bodies 12a in the non-pneumatic 2 tire of the example 2 was employed as the comparative example 2.

A pneumatic tire with internal pressure of 230 kPa was employed as the conventional example.

The sizes of the tires of the example 1, the example 2, the comparative example 1, the comparative example 2, and the conventional example were all 195/55 R16.

In the example 1, the tire-widthwise H size and thickness of the first and the second connection plates 21 and 22 were 18 mm and 3.0 mm, respectively, and the tire-circumferential size and thickness of the plate-shaped body 12a of the ring-shaped body 12 were 16 mm and 3.5 mm, respectively.

In the example 2, the tire-widthwise H size and the thickness of the first and the second connection plates 21 and 22 were 18 mm and 2.0 mm, respectively, and the tire-circumferential size and the thickness of the plate-shaped body 12a of the ring-shaped body 12 were 16 mm and 3.5 mm, respectively.

In all of the example 1, the example 2, the comparative example 1, and the comparative example 2, the first and the second connection plates 21 and 22 were formed of stainless steel, and the ring-shaped body 12 was formed of aluminum alloy.

First, the conventional example was set as the assessment standard (100), and the non-pneumatic tire of the example 1 was assessed on the basis of numerical indexes of weight, rolling resistance, spring constant in the traveling direction, and spring constant in the braking direction.

As for the rolling resistance, when rotating the tires at a speed of 80 km/h with the tire closely pressed onto a drum of a drum tester by a force of 4.0 kN, resistance applied to a drum shaft was measured.

The spring constants were measured on the basis of force and movement (deformation of tire) when a rigid plate is pressed in a direction along the tire-circumferential direction among the directions, which are perpendicular to a direction of closely pressing the tire to the rigid plate, with the tires of the examples, the comparative examples, and the conventional example closely pressed onto the rigid plate by a force of 4.0 kN.

The result is shown in Table 2.

This table shows that the weight and the rolling resistance are lower as the values thereof are smaller, and the spring constant is larger as the value thereof is larger.

TABLE 2

| | Weight | Rolling Resistance | Spring Constant in Traveling Direction | Spring Constant in Braking Direction |
| --- | --- | --- | --- | --- |
| Example 1 | 103 | 80 | 102 | 102 |
| Conventional Example | 100 | 100 | 100 | 100 |

As a result, in the non-pneumatic tire of the example 1, it was confirmed that it was possible to suppress an increase in weight and to reduce rolling resistance as compared with the pneumatic tire of the conventional example. In addition, it was confirmed that it was possible to suppress the increase of the spring constants and to keep such spring constants equal to each other similar to the pneumatic tire of the conventional example.

Next, the comparative example 1 was set as the assessment standard (100), and the non-pneumatic tires of the example 1, the example 2, and the comparative example 2 were assessed on the basis of numerical indexes of contact pressure standard deviation, ride qualities, and durability.

The contact pressure standard deviation was assessed in a manner where the non-pneumatic tires of the comparative examples 1 and 2, and the examples 1 and 2 were closely pressed onto a flat plate through a pressure-sensitive paper by a force of 4.0 kN, thereby obtaining contact patterns of the tires to the ground, and the contact patterns were subjected to an image process.

The ride qualities were assessed on the basis of the driver's feeling, when the tires were mounted on a vehicle and two persons rode the vehicle to drive the vehicle.

The durability was assessed on the basis of the time when the tires of the comparative examples 1 and 2, and the examples 1 and 2 were rotated at a speed of 81 km/h with the tires closely pressed onto a drum of a drum tester by 5.2 kN and breakdown occurred.

The result is shown in Table 3.

This table shows that the contact pressure standard deviation is more satisfactory as the value thereof is smaller, and the ride qualities and the durability are more satisfactory as the values thereof are larger.

TABLE 3

|  | Contact Pressure Standard Deviation | Ride Qualities | Durability |
|---|---|---|---|
| Example 1 | 70 | 120 | 110 |
| Example 2 | 66 | 125 | 130 |
| Comparative Example 1 | 100 | 100 | 100 |
| Comparative Example 2 | 97 | 105 | 120 |

As a result, in comparison of the non-pneumatic tire 1 of the example 1 with the non-pneumatic tire of the comparative example 1 and in comparison of the non-pneumatic tire 2 of the example 2 with the non-pneumatic tire of the comparative example 2, it was confirmed that it was possible to reduce the contact pressure distribution as compared with the comparative examples, and it was possible to improve the ride qualities and the durability as compared with the comparative examples.

In the non-pneumatic tire 2 of the example 2, it was confirmed that it was possible to further reduce the contact pressure distribution and improve the ride qualities and the durability.

INDUSTRIAL APPLICABILITY

It is possible to suppress the increase in weight, hardness, and rolling resistance to secure satisfactory ride qualities and handling qualities, and it is possible to prevent a blowout from occurring. It is possible to make the distribution of contact pressure uniform, and to prevent a blowout from occurring.

The invention claimed is:

1. A non-pneumatic tire comprising:
an installation disk that is mounted on an axle;
a ring-shaped body that surrounds an outer circumferential face of the installation disk;
a plurality of connection members that are arranged in a tire-circumferential direction and connect the installation disk to the ring-shaped body; and
a tread rubber that is disposed over the entire outer circumferential face of the ring-shaped body,
wherein each connection member has a first connection plate curved so as to protrude in a first direction in the tire-circumferential direction and a second connection plate curved so as to protrude in a second direction that is opposite to the first direction, and each connection member is formed to be axisymmetrical about an imaginary line extending in the tire-radial direction,
the ring-shaped body is divided into a plurality of plate-shaped bodies in the tire-circumferential direction,
a plurality of installation members being provided at ends of the first and second connection plates respectively, the plurality of installation members capable of moving relative to each other with changes in a tire-circumferential length.

2. The non-pneumatic tire according to claim 1, wherein the first ends of the first connection plate and the second connection plate of the connection member are separately connected at the same position in the tire-circumferential direction and at positions different from each other in a tire-widthwise direction, on an inner circumferential face of the ring-shaped body.

3. The non-pneumatic tire according to claim 1, wherein the plurality of connection members are arranged in the tire-circumferential direction, such that a plurality of first connection plates are arranged at a first tire-widthwise position in the tire-circumferential direction and a plurality of second connection plates are arranged at a second tire-widthwise position in the tire-circumferential direction.

4. The non-pneumatic tire according to claim 1, wherein at least one group of the first ends of the first connection plate and the second connection plate, and second ends of the first connection plate and the second connection plate is rotably supported around a rotation axial line extending parallel to a tire-widthwise direction.

5. The non-pneumatic tire according to claim 1, wherein the first connection plate and the second connection plate are formed of metal or resin.

6. The non-pneumatic tire according to claim 2, wherein the plurality of connection members are arranged in the tire-circumferential direction, such that a plurality of first connection plates are arranged at a first tire-widthwise position in the tire-circumferential direction and a plurality of second connection plates are arranged at a second tire-widthwise position in the tire-circumferential direction.

7. The non-pneumatic tire according to claim 2, wherein the first connection plate and the second connection plate are formed of metal or resin.

8. The non-pneumatic tire according to claim 3, wherein the first connection plates and the second connection plates are formed of metal or resin.

9. The non-pneumatic tire according to claim 4, wherein the first connection plate and the second connection plate are formed of metal or resin.

10. The non-pneumatic tire according to claim 6, wherein the first connection plates and the second connection plates are formed of metal or resin.

11. The non-pneumatic tire according to claim 1, wherein a reinforcement layer is provided between the ring-shaped body and the tread rubber.

12. The non-pneumatic tire according to claim 1, wherein at least one of the plurality of installation members extends over two or more plate-shaped bodies adjacent to each other in the tire-circumferential direction.

* * * * *